(12) United States Patent
Naimer et al.

(10) Patent No.: US 6,822,624 B2
(45) Date of Patent: Nov. 23, 2004

(54) DISPLAY GENERATION SYSTEM

(75) Inventors: Hubert Naimer, Ascona (CH); Patrick Gerald Krohn, Bellevue, WA (US); Patrick Kemp Glaze, Duvall, WA (US); John Russell Jorgensen, Kirkland, WA (US)

(73) Assignee: Universal Avionics Systems Corporation, Tucson, AZ (US)

( * ) Notice: Subject to any disclaimer, the term of this patent is extended or adjusted under 35 U.S.C. 154(b) by 14 days.

(21) Appl. No.: 10/238,131

(22) Filed: Sep. 10, 2002

(65) Prior Publication Data

US 2004/0046712 A1 Mar. 11, 2004

(51) Int. Cl.$^7$ ................................................ G09G 5/00
(52) U.S. Cl. ......................................... 345/9; 345/629
(58) Field of Search ............................ 345/9, 629–634; 340/959, 960, 961, 963, 988–990; 701/3, 8, 9, 116, 122, 205

(56) References Cited

U.S. PATENT DOCUMENTS

| | | | | | |
|---|---|---|---|---|---|
| 4,758,782 A | * | 7/1988 | Kobayashi | .................. | 382/148 |
| 4,837,695 A | * | 6/1989 | Baldwin | ...................... | 701/15 |
| 4,980,833 A | | 12/1990 | Milligan et al. | ............ | 364/427 |
| 5,103,224 A | * | 4/1992 | Arad | .......................... | 340/959 |
| 5,185,808 A | * | 2/1993 | Cok | ........................... | 382/284 |
| 5,555,175 A | * | 9/1996 | D'orso | .......................... | 701/5 |
| 6,067,092 A | * | 5/2000 | Rinaldi et al. | .............. | 345/629 |
| 6,181,987 B1 | * | 1/2001 | Deker et al. | .................... | 701/3 |
| 6,199,015 B1 | * | 3/2001 | Curtwright et al. | ......... | 701/213 |
| 6,580,808 B2 | * | 6/2003 | Rhoads | ....................... | 382/100 |
| 6,731,825 B1 | * | 5/2004 | Acampora et al. | .......... | 382/284 |

OTHER PUBLICATIONS

"A Collection of Technical Papers" Part 2, 12th AIAA Applied Aerodynamics Conference pp. 871–879, Jun. 20–22, 1994.

* cited by examiner

*Primary Examiner*—Alexander Eisen
(74) *Attorney, Agent, or Firm*—Greenberg Traurig, LLP; Claude R. Narcisse

(57) ABSTRACT

A display generation system that is able to generate display signals for an underlay image with at least one embedded safety pattern and display images for an overlay image. The display generation system and method are able to determine whether there are any anomalies or graphical errors when an overlay display generated by the system or generated by some other system is displayed simultaneously with the underlay image with the embedded safety pattern. The display generation system uses the embedded safety pattern to detect the occurrence of anomalies in the simultaneous display and uses information from its own generated overlay image to detect graphical errors in the simultaneous display. Flight display systems for aircraft can use the display generation system and method of the present invention to display an underlay image depicting geographical scenery in the vicinity of the aircraft while on the ground, during takeoff or in flight. The underlay image is displayed simultaneously with an overlay image depicting standard graphics of a flight display system.

26 Claims, 8 Drawing Sheets

DISPLAY GENERATION SYSTEM

BACKGROUND OF THE INVENTION

1. Field of the Invention

The present invention relates to systems that generate signals for displaying graphic images and/or video images.

2. Description of the Related Art

Displays are part of many systems and are often used as instruments to provide graphical information to operators of the systems. The information displayed can, for example, represent the current status of a system or represent video, graphical and/or textual information that is used by an operator of the system to control and/or modify the operation of the system. In many applications, displays provide a plethora of textual information shown simultaneously at different locations on the displays. The observer would, in many such cases, typically consider several different items or pieces of textual information to properly determine the status of the system or to reach a conclusion about the particular matter being displayed. In yet other applications, displays may provide other graphical information simultaneously with the textual information to allow an observer or operator of the system to more quickly understand or reach a conclusion about the information being displayed. Displays are also used as a tool for various communication based systems such as personal computers, televisions receivers and security monitors where the displays receive signals from a remote or local (or both) signal source and provide the information to a user of the system. In some cases, the displays are providing graphical and/or video information where such information originate from different sources. Displays are implemented with various technologies to create display devices such as Cathode Ray Tube (CRT) monitors, Liquid Crystal Displays (LCD) and plasma displays.

One key application of displays is their use in monitoring, in real-time, various events and to provide a visual indication of such events in graphics form thus allowing an observer of such a display to make decisions based on the occurrence of one or more specific events in particular relationship to each other. An example of the use of displays to monitor events are the flight display systems used by aircraft pilots to operate and/or maneuver aircrafts during (1) take-off; (2) flight and (3) landing. One of the key instruments used by aircraft pilots is a display commonly referred to as a Primary Flight Display or PFD. The PFD provides graphical information regarding the status of the aircraft in flight. The PFD provides relatively little information when the aircraft is on the ground stationary or taxiing away from the landing strip after it has landed or taxiing toward the landing strip prior to take-off. When the aircraft is in flight, the PFD provides various information about the aircraft such as its roll (angle of wings relative to horizontal), heading, and the degree to which the nose of the aircraft is pointing upwards, downwards relative to the horizontal (commonly called "pitch"). The graphics depicted by the PFD are arranged in a standard format to allow a pilot to quickly locate a particular information by focusing in on the particular part of the display screen to which the information has been assigned.

Referring to FIG. 1 there is shown a standard graphic and textual information arrangement for a PFD. Note that textual information is included with other graphical information to allow the pilot of the aircraft to determine the status of various sensor readings being provided to the aircraft while in flight. The sensor readings are various types of information from different sources which are converted to graphical signals that can be shown on the PFD. The "inverted V" shown at generally the center of the display represents the aircraft. The aircraft is shown in reference to the horizontal. Referring now to FIG. 2 there is shown an annotated version of the PFD shown in FIG. 1. Some of the information labeled in FIG. 2 are used by the pilot while the aircraft is in flight, taking off or landing. For example, the "Zero Roll Reference" is used as a reference point for determining how much "roll" the aircraft is experiencing during flight. The roll bug depicts how much the aircraft is deviating from a zero roll orientation. The roll is a measure of how much the aircraft is rotated about its longitudinal axis (i.e., the axis that is oriented lengthwise of the aircraft). Also, various speeds are provided to the aircraft which are used by the pilot during take-off. Some of the critical speeds are referred to as "V-speeds." V-speed $V_1$ represents the maximum speed during take-off at which the pilot must take the first action (e.g., apply brakes, reduce thrust, deploy speed brakes) to stop the airplane. $V_1$ also means the minimum speed in the takeoff, following a failure of an engine, at which the pilot can continue the take-off and achieve the required height above the takeoff surface within the takeoff distance. $V_R$ represents the speed at which the pilot must act to cause the airplane to rotate or pitch upwards during takeoff. A glossary of the various terms used to describe the displayed information in FIG. 2 can be found in 14 CFR (Code of Federal Regulations) part 1, of Federal Aviation Regulations Handbook which is incorporated herein by reference.

A perusal of the various labels in FIG. 2 indicates that most, if not all, of the information being displayed by the PFD are applicable when the aircraft is in flight. Some of the information such as $V_R$, $V_1$ and $V_{REF}$ are extremely critical in the control of the aircraft during take-offs and landings. $V_{REF}$ is a critical speed used during approaches and landings. The aircraft's specific location on the runway prior to and during take-off is important to know for the proper operation of the aircraft. For example, for take-offs, the aircraft should be traveling at a certain speed at a certain point on the runway for a proper and safe take-off. The specific point on the runway at which the aircraft is to have a certain speed, such as $V_R$, is one type of information that is not provided by a standard PFD. Various other information that can be extremely useful to a pilot of an aircraft during takeoffs, landings and during flight either are not available to the pilot or are not provided by the PFD. These types of information can be easily displayed on the PFD, but at the risk of (1) adversely affecting the clarity of the standard information that is typically displayed on the PFD and (2) modifying the particular arrangement of the information to accommodate for the additional information being displayed. The clarity of the information being displayed is adversely affected because more information is being displayed in the same area and therefore an information clutter develops which makes it more difficult to read the display and distinguish between various pieces of information. The traditional arrangement of the information may have to be modified to a certain extent to allow for the additional information being displayed. A modification in the arrangement of the displayed information results in pilots having to be retrained so they can quickly locate certain types of information at certain critical times during landings, takeoffs or even during flight. More generally, the additional information to be displayed visually affects the overall appearance of the display so that a defined standard display will not only lose its clarity of appearance but also lose the advantages gained in having such a standard design. What is therefore needed is a technique for displaying additional information on a display already depicting information arranged in a standard or well defined arrangement without adversely affecting the overall clarity of the standard arrangement and without modifying the standard arrangement.

SUMMARY OF THE INVENTION

The present invention provides a display generation system and method for generating at least one underlay image having an embedded safety pattern and causing such underlay image to be displayed simultaneously with an overlay image such that the underlay image is compatible with and complementary to the overlay image. The display generation system has access to image databases containing image information that are used to generate the underlay image. The display generation system also has access to one or more data sources providing image information that are used to generate the overlay image.

The display generation system comprises a display processing engine that processes the information from the data sources to create display signals for at least one overlay image. The display processing engine also processes information from the image databases to create display signals for at least one underlay image having an embedded safety pattern. The display generation system further comprises an image processor coupled to the display processing engine, an integrity monitor module coupled to the image processor and a display monitoring module coupled to the integrity monitor module. The display processing engine provides display signals for both the overlay image and the underlay image with embedded safety pattern to the image processor. The image processor formats and processes the display signals so that they cause images to appear when applied to a display device.

The formatted and processed display signals are applied to the integrity module which uses the embedded safety pattern to obtain an image processing result, i.e., determine whether any unacceptable anomalies exist when the two images are displayed simultaneously by a display device. The integrity module then applies its image processing result and the display signals to a display monitoring module which performs error detection processing to obtain an error detection result, i.e., determine whether the simultaneous display of overlay image and underlay image contains any graphical errors. The display monitoring module is coupled to the display processing engine and thus transfers the image processing result and the error detection result to the display processing device. The display processing device will stop generating display signals if either a graphical error or an unacceptable image anomaly was determined.

A display device coupled to the display generation system of the present invention is thus able to display the underlay image simultaneously with the overlay image where the overlay image is generated by a system other than the display generation system of the present invention and where such other system uses the same data sources as those used by the display generation system to generate the overlay image.

DETAILED DESCRIPTION

Figure 1:
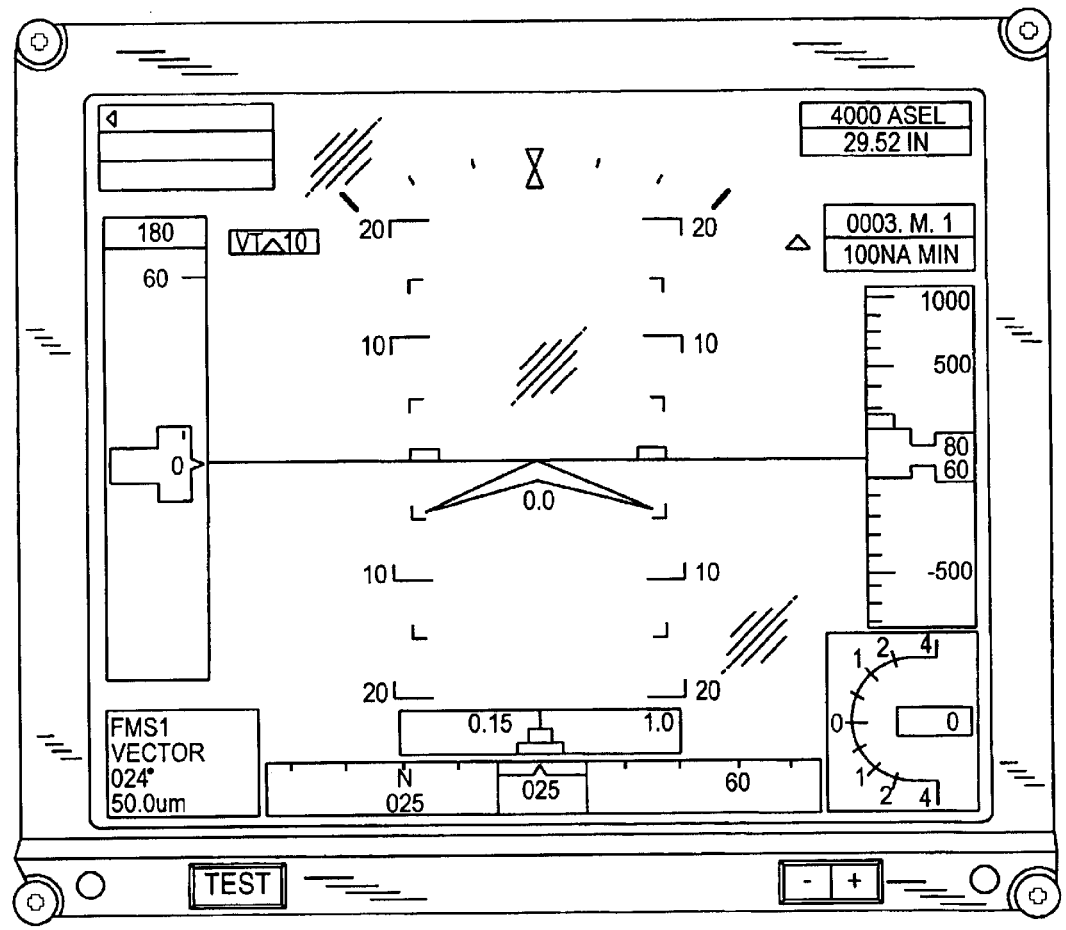
FIG. 1 shows a display device depicting a standard PFD graphic.
Figure 2:
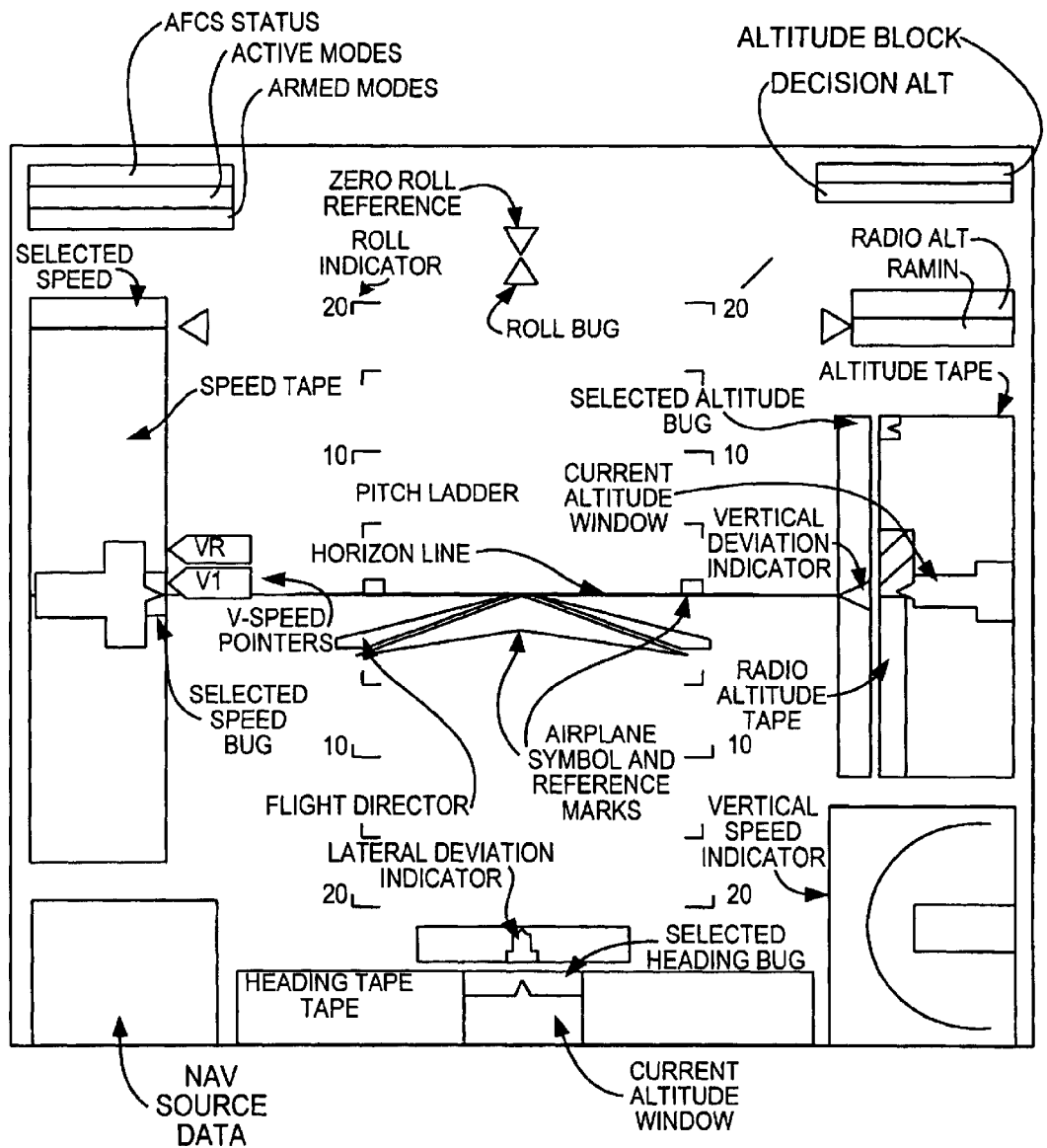
FIG. 2 shows an annotated version of the display of FIG. 1.

The present invention provides a display generation system and method for generating at least one underlay image having an embedded safety pattern and causing such underlay image to be displayed simultaneously with an overlay image such that the underlay image is compatible with and complementary to the overlay image. The display generation system has access to image databases containing image information that are used to generate display signals for the underlay image. The display generation system also has access to one or more data sources providing image information that are used to generate display signals for the overlay image. Some or all of the image information obtained from the data sources can also be used to generate display signals for the underlay image with embedded safety pattern. The display signals are signals that represent graphic images and/or video pictures.

The display generation system comprises a display processing engine that processes the information from the data sources to create display signals for at least one overlay image. The display processing engine also processes information from the image databases to create display signals for at least one underlay image having an embedded safety pattern. The display generation system further comprises an image processor coupled to the display processing engine, an integrity monitor module coupled to the image processor and a display monitoring module coupled to the integrity monitor module. The display processing engine provides display signals for both the overlay image and the underlay image with embedded safety pattern to the image processor. The image processor formats and processes the display signals so that they cause images to appear when applied to a display device.

The formatted and processed display signals are applied to the integrity module which uses the embedded safety pattern to determine an image processing result, i.e., whether any unacceptable image anomalies exist when the two images are displayed simultaneously by a display device. The integrity module then applies its image processing result and the display signals to the display monitoring module which performs error detection processing to determine an error detection result, i.e., whether the simultaneous display of overlay image and underlay image contains any graphical errors. The display monitoring module is coupled to the display processing engine and thus transfers the image processing result and the error detection result to the display processing engine. The display processing device will stop generating display signals if either a graphical error or an unacceptable image anomaly was determined. The display signals for the underlay image are transferred to a display device that is displaying or is capable of displaying the overlay image generated by a system other than the display generation system of the present invention.

A display device coupled to the display generation system of the present invention is thus able to display simultaneously at least one underlay image (having an embedded safety pattern) complementary to and compatible with an overlay image where the overlay image is generated by a system (or device) other than the display generation system of the present invention and where such other system uses the same data sources as those used by the display generation system to generate the overlay image. In another embodiment, the overlay image being simultaneously displayed with the underlay image can be generated by the display generation system of the present invention.

It should be well understood that the overlay image is generated from a compilation of information from various data sources that may provide graphical, video and other display based information where such information can be processed in a well known fashion to generate one or more images. The overlay image is a graphic and/or video image with which at least one underlay image with embedded safety pattern can be displayed. The overlay image can be a standard graphic (or video) image that does not change or it can be a dynamic graphical representation comprising a plurality of graphic (or video images) shown sequentially in any order (e.g., animated graphics). Video images are the standard pictures generated by a video camera or similar device to generate moving or still pictures. The graphic image for an underlay image or an overlay image contains graphic data or textual information (e.g., alphanumeric characters, scientific symbols, mathematical symbols and other symbols) and graphical representations such as charts, geometric shapes, facsimiles (i.e., drawings) of animate or inanimate objects (including airport facilities and obstacles), scenery, physical surroundings that can be made to appear mobile or stationary. The overlay image can be either a graphic image or a video image or both. The underlay image is generated from image databases and when displayed on a display device can also be either a graphical image or a video image or both. The underlay image has at least one embedded safety pattern and has similar characteristics to the overlay image.

Figure 3:
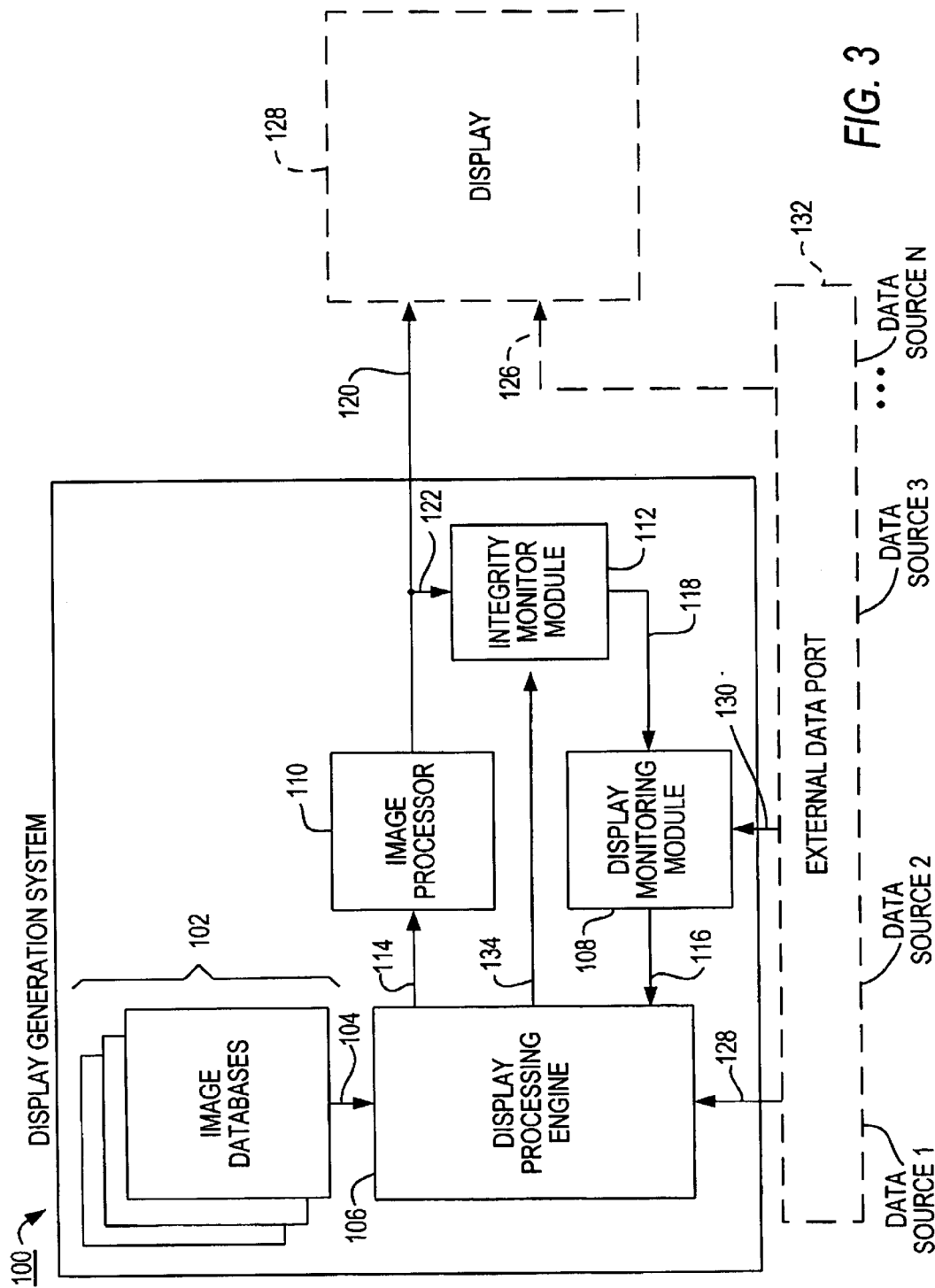
FIG. 3 is a block diagram of the display generation system of the present invention.

Referring to FIG. 3, there is shown a block diagram of the display generation system of the present invention. It will be understood that the components appearing in dashed lines are not part of the display generation system and method of the present invention; such components are included in FIG. 3 solely for ease of explanation. The display generation system and method of the present invention will be described in the context of a PFD typically used in commercial aircrafts, military aircrafts, private aircrafts and other types of aircrafts. It will, however, be clearly understood that the display generation method and system of the present invention are applicable to any display system that is able to display video and/or graphic information.

Display generation system 100 comprises a display processing engine 106 that obtains image information from various image databases 102 and also receives external information (from various data sources via path 128) that can be processed to provide graphical and/or video information. The term image as used in this application comprises either one or more graphic images or arrangement or video images or any combination thereof. Image databases 102 is one or more databases containing information used to generate an underlay image depicting objects (animate or inanimate), environments, overall geographical areas with various levels of details. The objects or scenery can be made to appear in motion or can be stationary. Moreover, different perspectives of the various objects, environments and geographical areas or scenery can also be stored in these image databases.

Display processing engine 106 processes the image information and the external information (received via path 128) to generate display signals that represent at least one underlay image having one or more embedded safety patterns and at least one overlay image. The display signals can be digital and/or analog signals in the form of electrical signals, infrared signal, optical signals or any other type of signal that can be converted by a display to depict images. The paths connecting the various components can be any well known media typically used to transmit and/or receive signals. Therefore, the paths can be, for example, copper or other electrical wire, coaxial cables, fiber optic cables and wave guides. Display processing engine 106 is therefore any device or system that is able to obtain information regarding images and generate display signals for the images.

The underlay image is thus any image comprising (a) one or more embedded safety patterns and (b) graphic and/or video images where such underlay image is generated from display signals created by display processing engine 106 which display signals are derived from external information (from external data port 132 via path 128) and image data bases 102. The embedded safety pattern is used to determine whether any image anomalies exist in the display as a result of the underlay image and overlay image being displayed simultaneously. An image anomaly is the occurrence of distorted graphical and/or video images. An example of an image anomaly is when a portion of a graphical image is depicted in the wrong color or is depicted with the wrong proportions. Image anomalies generally occur when the overlay image and the underlay image do not complement each other so that the images actually interfere adversely with each other. Inconsistencies can also occur in the displayed underlay and overlay images due to incorrect or erroneous processing by the display generation system of the present invention. An inconsistency occurs when the processing performed by the display generation system results in graphical errors, i.e., inaccurate or incorrect textual information, symbols or charts being displayed. An example of a graphical error is when a particular displayed value of a parameter for some system (e.g., pitch, roll, heading) is incorrect. Inconsistencies generally occur when the overlay image and the underlay image are not compatible with each other and incorrect or improper processing is performed by the display generation system of the present invention.

The display signals generated by display processing engine 106 for the underlay image (with embedded safety pattern) and the overlay image appear on path 114 and are applied to image processor 110 which generates processed display signals for the underlay (with embedded safety pattern) and overlay images onto path 122 for application to integrity monitor module 112. Image processor 110 processes the display signals so that they become compatible with one or more formats (or protocol) commonly used by display devices. Image processor 110 performs a function similar to a symbol generator circuit that is typically used by display devices to generate images; that is, the display signals are converted to VGA (Variable Graphics Array) signals or an RGB (Red, Green and Blue) signal or any other well known analog and/or digital signals typically used to generate images on a display device. The display signals for the underlay image (with embedded safety pattern) are routed onto path 120 for reception by display device 128. The processed display signals for the underlay image (with embedded safety pattern) from image processor 110 are thus ultimately used to cause images to appear on display 128. Note that the processed display signals for the overlay image are preferably not routed onto path 120; display device 128 obtains graphic/video information from the various data sources 1 to N via path 126 and is able to generate its own overlay image; N is an integer equal to 1 or greater. Alternatively, the overlay image being displayed by display device 128 can be derived from display signals generated by a system (not shown) other than the display generation system of the present invention which has access to the data sources 1 to N. The displayed overlay image can, however, be an overlay image created from display signals generated by display processing engine 106. Regardless of how the overlay image being displayed by display device 128 is generated, such overlay image is derived from the same data sources 1 to N used by display processing engine 106 to generate its own version of the overlay image. The underlay image (with embedded safety pattern) on path 120 is thus ultimately displayed by display device 128.

The embedded safety pattern, which is part of the underlay image, can be a specific train of pixels (i.e., picture elements) or display signals that cause a specific pattern made from one or several horizontal lines to be displayed; an entire display or display screen typically contains several hundred horizontal lines. Note that in the case of digital video, the pattern would be generated by a Cyclic Redundancy Check (CRC) technique—a well known technique. Hereinafter, the terms "display" and "display screen" will be used interchangeably. The embedded safety pattern, which may not be visible to the naked eye, is created using a specific arbitrary pattern generated by an algorithm within display processing engine 106. The pattern is a specific set of shapes (e.g., horizontal bars, vertical bars) having a specific intensity and a specific color mixture at various points along one or more horizontal lines. When the pattern is embedded in an underlay image and then that underlay image is displayed simultaneously with an overlay image, the resulting pattern is determinable by using well known image processing techniques. This is because, the location of the pattern is known and the specifics of the underlay image and the overlay image at the same location are also known. Therefore, the combination of the displays at that location can be determined. For example, suppose a picture element for the pattern at a specific location has color blue of a certain intensity and the corresponding picture element for the underlay image at that location is yellow of a certain intensity and further the corresponding picture element for the overlay image is red of a certain intensity. The resulting color and intensity of the pixel at the location described is the combination of blue, yellow and red and a combination of the corresponding intensities. It is thus in this manner that the color and intensity at designated locations defined by a pattern can be predicted. When the resulting color and intensity do not match the predicted color and intensity, an occurrence of an anomaly is declared by integrity monitor module 112. The embedded pattern can be made to vary at equal time intervals or at irregular time intervals.

Integrity monitor module 112—having received via path 122 display signals for at least one underlay image (with embedded safety pattern) and an overlay image generated by display processing engine 106 and processed by image processor 110—also receives the embedded safety pattern generated by display processing engine 106 via path 134. Integrity monitor module 112 also receives via path 134 information from display processing engine 106 as to the specific location of the embedded safety pattern. Such location may be changed periodically or non-periodically by display processing engine 106. Also, the particular pattern (i.e., color intensity at various points along the pattern) can be changed periodically or non-periodically by display processing engine 106. Integrity monitor module 112 performs image processing (as described above) to obtain an image processing result which is a determination of whether there are any anomalies in the simultaneous display of the overlay and underlay image (with embedded safety pattern).

Still referring to FIG. 3, integrity monitor module 112 transfers its image processing result and the display signals for the overlay image and underlay image to display monitoring module 108 via path 118. The overlay and underlay images received from integrity monitor module 112 contain graphical information whose accuracy is to be checked by display monitoring module 108. Display monitoring module 108 performs error detection processing to determine whether any of the graphical information, i.e., textual information, graphic symbols and charts, are erroneous. Display monitoring module 108 receives information from external data sources 1 to N via path 130. Display monitoring module 108 can thus derive the graphical information (associated with the overlay image) from the external information it receives via path 130 and detect any mismatches between its derived graphical information and the graphical information it received via path 118. Any mismatches are indications of occurrences of graphical errors. Display monitoring module 108 thus obtains an error detection result.

The processing results from display monitoring module 108 and integrity monitor module 112 are passed on to display processing engine 106 via path 116. Display processing engine 106 will either (1) continue to generate display signals for the underlay image (with embedded safety pattern) and overlay image or (2) discontinue generating display signals if either a graphical error or an image anomaly was detected. Display monitoring module 108 can transfer the specific causes of the graphical errors or image anomalies to allow display processing engine 106 to possibly determine the source of errors and/or anomalies and, if possible, make modifications in its processing to eliminate or reduce the frequency of occurrence of such anomalies and/or errors.

Figure 4:
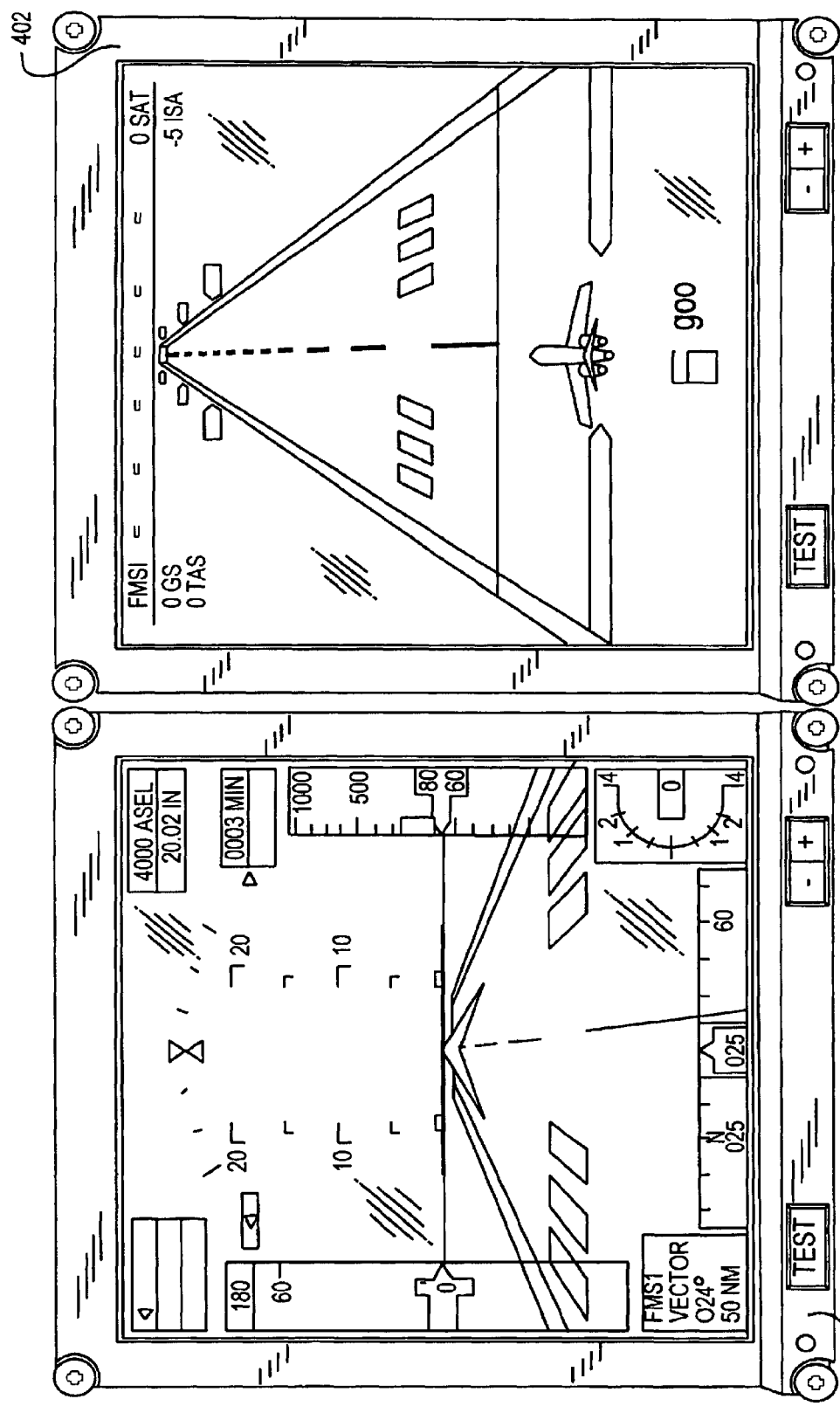
FIG. 4 shows a PFD display device depicting an overlay image of a standard PFD simultaneously with an underlay image and a Navigation Display device an underlay image of an aircraft on a runway.

Referring now to FIG. 4, there is shown two display devices that are part of aircraft instrumentation and are displaying scenes (in 3-D perspective view) generated by the display generation system and method of the present invention. The 3-D perspective view or three dimensional perspective view refers to underlay images appearing to have depth. Display device 400 has an overlay image depicting the graphics of a standard PFD device. Display device 400 also has an underlay image depicting a runway and associated geographical details. The underlay image displayed by PFD 400 is generated using the display generation system of the present invention where the image of a particular runway at a particular airport is stored in an image database. The geography of an entire airport, including particular landmarks, towers, location of hangars, the topology of paths connecting runways, natural obstacles, man-made obstacles can all be stored in the image database. Further, not only is the geography and terrain of the airport can be stored and accessed as underlay image, but also the terrain of the area covered by the flight plan of the aircraft can also be stored and thus can be generated an underlay images. That is, during flight, landmarks such as mountains, rivers, and other noticeable ground features can be displayed graphically as underlay images.

Display 400 as is clearly shown is able to display various data on the display screen that are part of a standard PFD display. For example, during flight such parameters as air speed, cabin pressure, altitude, air temperature, PPOS (present position of aircraft expressed in terms of longitude and latitude), aircraft pitch, aircraft roll, aircraft heading, aircraft track are all parameters that can be shown as part of the overlay image shown by display 400. A list of the parameters that can be displayed by a PFD during flight is found in the previously cited FAA handbook. While on the ground and during takeoff such parameters as $V_R$ and $V_1$ and AGL altitude (Above Ground Level—height above ground) are also displayed in the overlay image. Note that the underlay display image of display 400 uses in a complementary manner the inverted graphics of the overlay image to represent the aircraft. As the aircraft rushes down the runway, the runway stripes and various markers are shown rushing pass the aircraft. The runway depicts the actual runway and its position relative to the aircraft. Therefore, when the aircraft is taking off during inclement weather or when visibility is poor, the pilot is able to determine the aircraft's position along the runway by observing display 400 with the underlay image of the runway and associated geographic surroundings.

Display device 402 is displaying an underlay image (in 3-D perspective view) of an aircraft at the start of the runway. Display device 402 is known as a Navigation display and has a standard overlay image (not shown) showing the relative positioning of the aircraft during flight reference to the ground. Prior to the flight, the pilot enters a flight plan designating the particular route to be taken by the aircraft and the height and position (latitude, longitude) of the aircraft at specific designated points in the planned route. The flight plan also contains the heading of the aircraft at the designated points in the flight; these designated points are referred to as way points. The underlay image being displayed by display device 402 has distances marked along the runway markers (e.g., 6900 feet to end of runway is shown) that show certain critical distances along the runway.

The Global Positioning System (GPS) is used to obtain the PPOS (present position) values for the aircraft as it is taxiing toward the designated runway; thus the aircraft can determine its position (to within the accuracy of the GPS system) relative to the actual center of the runway. Alternatively, as an enhancement or addition to GPS information, the pilot of the aircraft can confirm to the display generation system of the present invention that the aircraft is indeed aligned to the center of the runway and the aircraft is so positioned at the start of the runway. An underlay image such as that shown by display device 402 can then be generated and shown on a Navigation display along with overlay textual information as shown.

Figure 5:
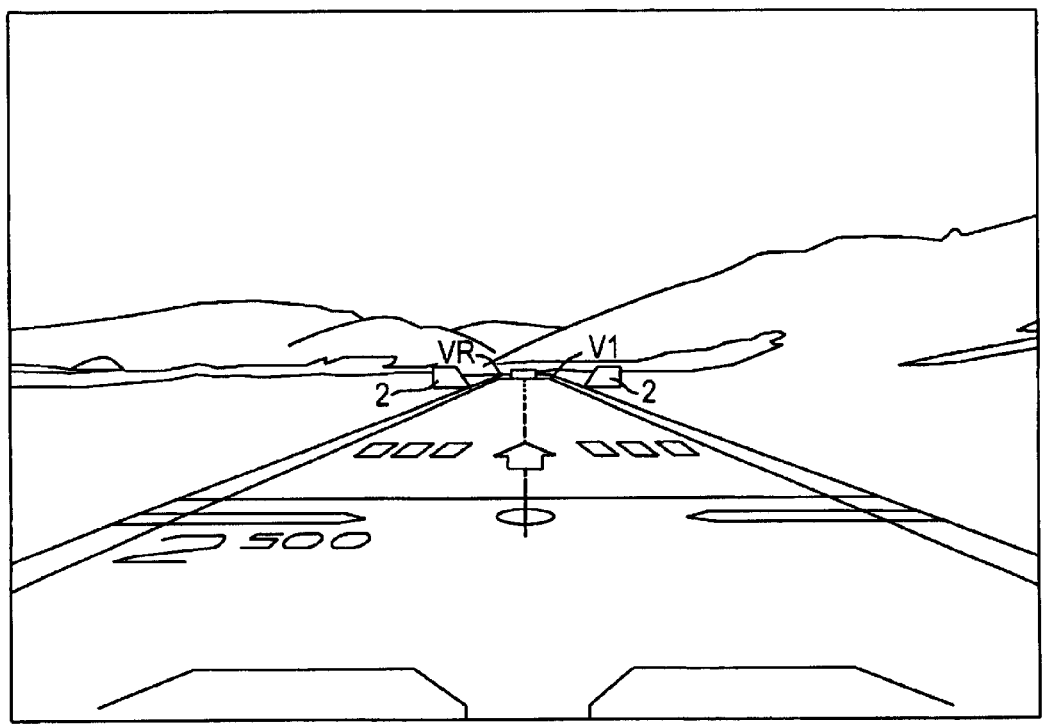
FIG. 5 shows another underlay image of a runway with V-Speed markers that can be displayed on a PFD or a Navigation display.

Referring to FIG. 5, there is shown another example of an underlay image (in 3-D perspective view) that can be shown on either a PFD device or a Navigation display device. The scene depicted by FIG. 5 is the aircraft going down the runway as it is about to pass the 2600 foot marker. Note the geographical landmarks in the distance and around the runway. Depending on the amount of information stored in the image databases, more or less details can be shown in this underlay image. Also note that the speed markers $V_1$ and $V_R$ are shown at the particular distances where the aircraft should reach these speeds as it is speeding down the runway. That is, if the aircraft is traveling at the proper speed and acceleration, then the markers shown will appear stationary and will be reached and passed as the aircraft speeds down the runway. However, if the aircraft is accelerating too slowly down the runway, the markers will appear to be moving away from the aircraft signaling to the pilot that the speed of the aircraft is too slow. Conversely, if the aircraft is accelerating faster than necessary down the runway, the markers will appear to be rushing toward the aircraft signaling to the pilot that the current speed and acceleration of the aircraft is higher than necessary. Thus, the underlay image not only can show the physical characteristics in the immediate vicinity of the aircraft (while in flight or on the ground), but it can provide additional information to a pilot of an aircraft in the way it depicts and arranges graphical data in the display.

It should be noted that the underlay image shown in FIG. 5 is generated from information stored in one or more image databases and from real time information being provided by various aircraft sensors (i.e., various data sources) as the aircraft is speeding down the runway. The Display Generation system uses several well known numerical methods to compute the speed and acceleration and location of the aircraft as it speeds down the runway and takes off. In particular such data as temperature, wind speed and direction, runway slope and runway conditions (e.g., dry runway, wet runway, smooth runway) are obtained from aircraft sensors or pilot entry and these data are applied to one or more predefined acceleration versus speed curves from a set of such curves calculated for various values of the data. These curves may either be generated analytically from a theoretical engine and aeronautical models or they may be generated from empirical data recorded during actual flights. One or more curve that is within acceptable limits or closely matching the data are selected. Speed versus acceleration coefficients to apply to a polynomial that relates speed to acceleration. V speed $V_1$ is calculated using the polynomial. V speed $V_R$ is also calculated using the polynomial while assuming that there is constant acceleration from $V_1$ to $V_R$. A $4^{th}$ order Runge-Kutta mathematical integration of the polynomial is used to compute the distance along the runway at which $V_1$ should be reached. The Runge-Kutta mathematical integration is a well known numerical method for approximating the mathematical operation of integration used in integral calculus. The V speeds are thus calculated in real time as the plane is speeding down the runway.

Figure 6:
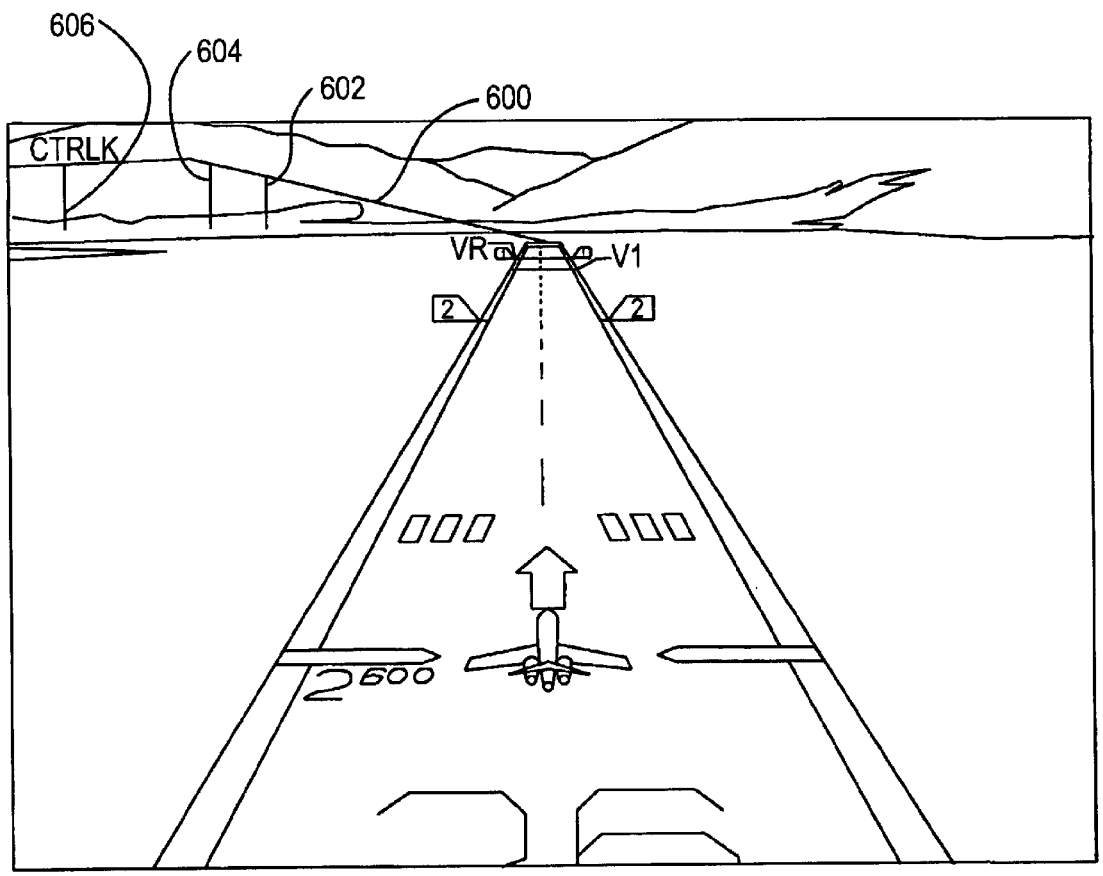
FIG. 6 shows an underlay image of an aircraft going down a runway and the flight path of the aircraft after take-off.

Referring to FIG. 6, there is shown another 3-D perspective view of the scene shown in FIG. 5. The underlay image in FIG. 6 can be shown on the Navigation display device. At the end of the runway, there is shown flight path 600 as the path to be taken by the aircraft after takeoff. In particular, flight path 600 shows that the aircraft is to veer to the left after takeoff. Also, some particular markers (602, 604, 606) are displayed showing that the aircraft is to increase its altitude at markers 602 and 604 and level off at marker 606. Flight path 600 is calculated from the flight plan entered by the pilot prior to operating the aircraft. The flight plan is external information stored in the Flight Management System source that is accessible to the navigation display, the PFD and the display generation system of the present invention.

Figure 7:
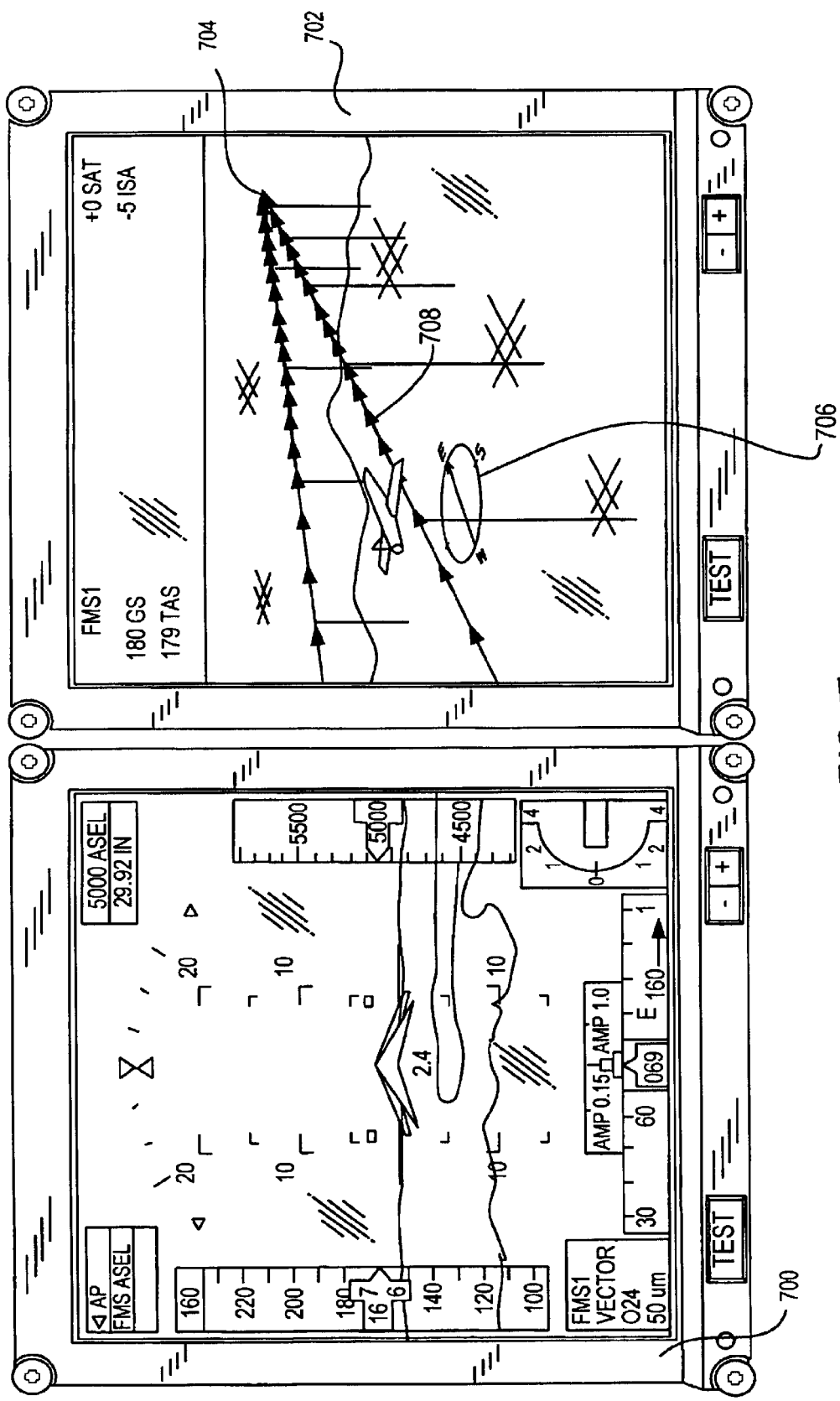
FIG. 7 shows a PFD display of overlay and underlay images of the aircraft in flight and a Navigation display of a perspective view of the aircraft in flight.

Referring now to FIG. 7, there is shown PFD 700 depicting standard PFD graphics and an underlay image depicting the geography (in 3-D perspective view) in the vicinity of the aircraft during flight. Display device 702 is a navigation display showing the same underlay image but from a different perspective. The underlay image shown by display 702 is part of the images stored in image databases which can contain the geography (with various levels of detail) for virtually anywhere on earth. The particular altitude of the aircraft along with its latitude and longitude—obtained from the GPS system—allows the proper scenery to be retrieved from one or more image databases to generate a scene such as the one shown by display 702. Note that the scene being displayed shows the designated flight path 708 of the aircraft as entered into the Flight Management system and a certain marker 704 is shown specifying the aircraft's altitude and position at a certain point along its flight. Note that marker 704 is a point at which the aircraft will change direction. Also, a compass graphic 706 is included to graphically inform the pilot the particular heading of the aircraft as it is traveling along flight path 708. The textual information at the upper left and upper right corners of the display screens are standard textual information displayed by the Navigation display. Thus, the textual information is an overlay display.

Figure 8:
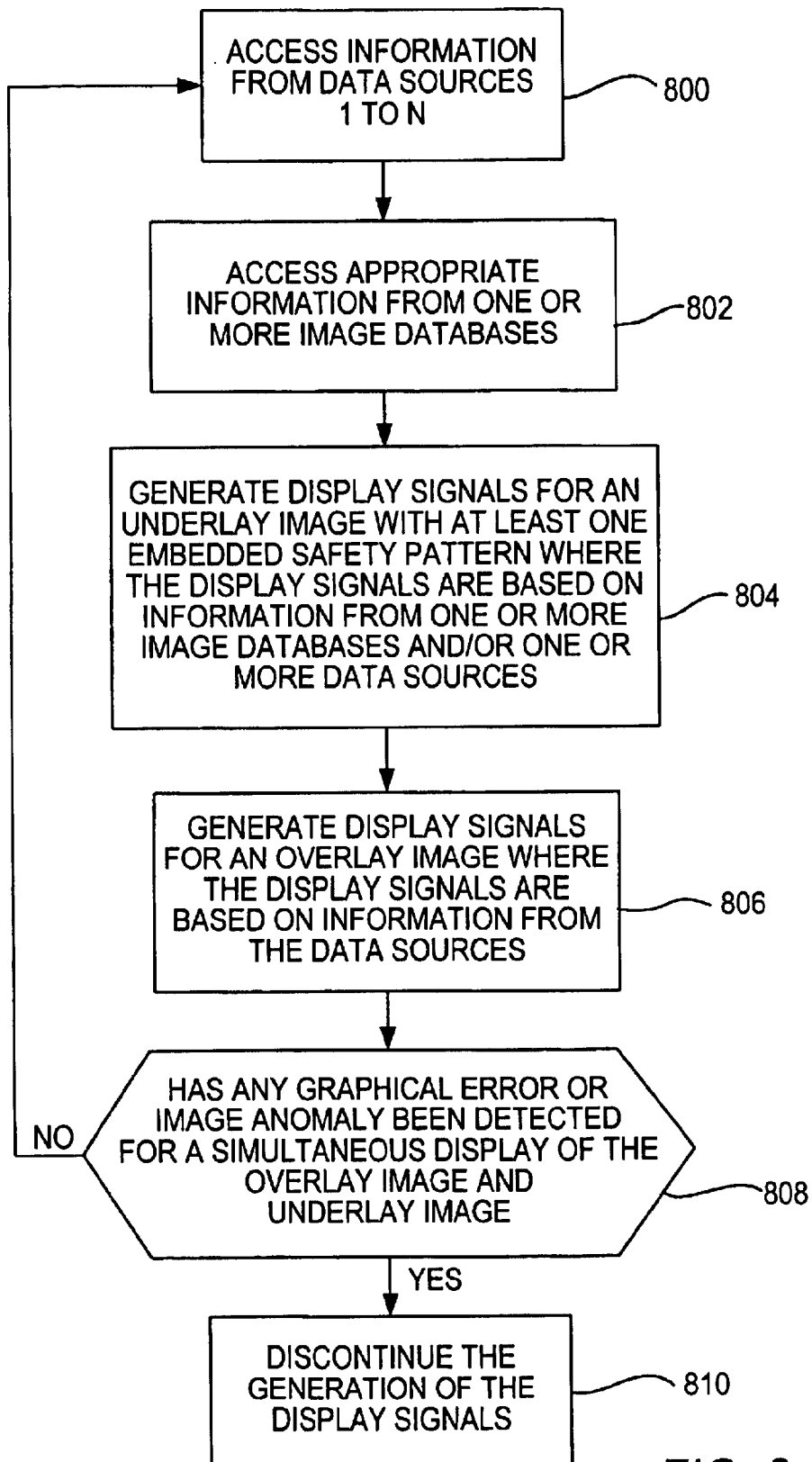
FIG. 8 shows a flow chart of the method of the present invention.

Referring now to FIG. 8, there is shown the method of the present invention. In step 800 information from external data sources are obtained. For the example of a PFD system, the information from the external data sources are data from aircraft sensors that provide information on the status of the aircraft and the environment in the immediate vicinity of the aircraft. Examples of aircraft sensor data include air/ground indication (i.e., whether the aircraft is on the ground or in the air), air temperature, present position of aircraft (PPOS). In step 802, the method of the present invention retrieves information from one or more image databases that contain geographical data and other graphical data for the immediate surroundings of the aircraft. The appropriate information from the image databases is retrieved based on the location of the aircraft. For example when the aircraft is on the ground and is taxiing toward the runway, the information accessed form the image databases will be airport geography data consistent with the aircraft's location. In step 804, display signals for an underlay image are generated based on the accessed information (from data sources and image databases). The underlay display signals are generated not only to display an underlay image but also to create a safety pattern embedded in the underlay image. The safety pattern may or may not be detectable to the naked eye when the underlay image is displayed on a display device. In step 806 display signals for an overlay image are generated. The overlay image display signals are based on the information obtained from the data sources. In step 808, for a simultaneous display of the underlay image and the overlay image, image processing is performed on the display signals to determine whether image anomalies or graphical errors exist. If no image anomalies and/or graphical errors are detected, the method of the present invention returns to step 800 and continues to access information to generate display signals for the simultaneous display of at least one underlay image (having an embedded safety pattern) and an overlay image. If, however, an image anomaly or a graphical error is detected, then the method of the present invention moves to step 810 where display signals are no longer generated. In step 810, the display generation system of the present invention can obtain information as to the source of the error or anomaly or both and take steps to correct for the errors. Alternatively, the display generation system of the present invention may postpone processing for a defined period of time and then begin processing once again starting at step 800. The display generation system of the present invention may also wait for a control signal from an external system that signals when to resume processing.

The display generation system and method of the present invention can be implemented in any well known fashion including the use of a computer system to obtain the image information and circuitry (e.g., electrical, electronic, optic) to generate display signals for the image information. The various components of the display generation system can be implemented with analog and or digital circuitry using digital signal processors, microprocessors under the control of software or firmware. Alternatively, the entire display generation system and method can be implemented with hardware specially designed to perform the functions of the various components of the display generation system as described supra.

We claim:

1. A display generation system comprising:
  a display processing engine that generates display signals for at least one underlay image having at least one embedded safety pattern and display signals for at least one overlay image so that image anomalies and/or graphical errors are detected with the use of the embedded safety pattern when the underlay image is displayed simultaneously with the overlay image, wherein the displayed overlay image is generated by either the display generation system or some other system or device.

2. The system of claim 1, wherein display signals for the at least one underlay image are generated using information from one or more image databases.

3. The system of claim 1, wherein display signals for the at least one overlay image are generated using information from one or more data sources.

4. The system of claim 1, wherein the at least one underlay image comprises information depicting at least one of animate objects, inanimate objects, environments and geographical areas with one or more levels of detail.

5. The system of claim 1, wherein the at least one overlay images comprises graphical and/or video images.

6. The system of claim 1, wherein the embedded safety pattern comprises a pattern of picture elements and/or display signals that cause a specific pattern made from one or more horizontal lines to be displayed.

7. The system of claim 1, wherein an image anomaly occurs when at least one underlay image and at least one overlay image do not complement each other or interfere with each other.

8. The system of claim 1, further comprising:
  an image processor that formats and processes the display signals of the at least one underlay and at least one overlay image;
  an integrity module that receives the processed display signals from the image processor, and produces an image processing result based on whether the simultaneous of the display of the at least one overlay and the at least one underlay image contains an image anomaly; and
  a display monitoring module that receives the processed display signals from the image processor and the image processing result from the integrity module, and that produces an error detection result based on the simultaneous display of the at least one overlay image and the at least one underlay image.

9. The system of claim 8, wherein the error detection result reveals whether one or more graphical errors occurred.

10. The system of claim 1, wherein the generation of displays signals for the at least one underlay and the at least one overlay image are stopped if an anomaly or a graphical error is detected.

11. The system of claim 1, wherein the image database includes an image of a geography of an airport including at least one of a runway at the airport, terrain of the area covered by a flight plan of an aircraft, landmark, tower, location of a hanger, topology of paths connecting a runway, natural obstacles and man-made obstacles.

12. The system of claim 1, wherein the display system is used to provide information to operate and/or maneuver aircraft at least one of during take-off, flight and landing.

13. The method of claim 1, where the generated display signals are displayed on a Primary Flight Display (PFD) of an aircraft.

14. A method for generating images, the method comprising the step of:
    generating display signals for at least one underlay image with at least one embedded safety pattern so that image anomalies and/or graphical errors are detected with the use of the embedded safety pattern when the underlay image is displayed simultaneously with an overlay image.

15. The method of claim 14, wherein display signals for the at least one underlay image are generated using information from one or more image databases.

16. The method of claim 14, wherein display signals for the at least one overlay image are generated using information from one or more data sources.

17. The method of claim 14, wherein the at least one underlay image comprises information depicting at least one of animate objects, inanimate objects, environments and geographical areas with one or more levels of detail.

18. The method of claim 14, wherein the at least one overlay image comprises graphical and/or video images.

19. The method of claim 14, wherein the embedded safety pattern comprises a pattern of picture elements and/or display signals that cause a specific pattern made from one or more horizontal lines to be displayed.

20. The method of claim 14, wherein an image anomaly occurs when at least one underlay image and at least one overlay image do not complement each other or interfere with each other.

21. The method of claim 14, further comprising:
    formatting and processing the display signals of the at least one underlay and the at least one overlay image;
    receiving the formatted and processed display signals, and producing an image processing result based on whether the simultaneous of the display the at least one overlay and the at least one underlay image contains an image anomaly; and
    receiving the formatted and processed display signals and the image processing result, and producing an error detection result based the simultaneous display of the at least one overlay image and the at least one underlay image.

22. The method of claim 21, wherein the error detection result reveals whether one or more graphical errors occurred.

23. The method of claim 14, wherein generating displays signals for the at least one underlay and at least one overlay images are stopped if an anomaly or a graphical error is detected.

24. The method of claim 14, wherein the image database includes an image of a geography of an airport including at least one of a runway at the airport, terrain of the area covered by the flight plan of aircraft, landmark, tower, location of a hanger, topology of paths connecting a runway, natural obstacles and man-made obstacles.

25. The method of claim 14, generating display signals provides display signals for images with information to operate and/or maneuver aircraft at least one of during take-off, flight and landing.

26. The system of claim 1, where the display signals are displayed on a Primary Flight Display (PFD) of an aircraft.

\* \* \* \* \*